(12) United States Patent
Koganei

(10) Patent No.: US 8,705,984 B2
(45) Date of Patent: Apr. 22, 2014

(54) OPTICAL TRANSMISSION APPARATUS AND METHOD FOR CONTROLLING VARIABLE OPTICAL ATTENUATOR

(75) Inventor: Yohei Koganei, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 955 days.

(21) Appl. No.: 12/339,738

(22) Filed: Dec. 19, 2008

(65) Prior Publication Data

US 2009/0162022 A1 Jun. 25, 2009

(30) Foreign Application Priority Data

Dec. 25, 2007 (JP) ................................ 2007-332864

(51) Int. Cl.
*H04B 10/06* (2011.01)

(52) U.S. Cl.
USPC ............ 398/202; 398/208; 398/209; 398/210

(58) Field of Classification Search
None
See application file for complete search history.

(56) References Cited

U.S. PATENT DOCUMENTS

| | | | | |
|---|---|---|---|---|
| 6,134,034 A | * | 10/2000 | Terahara | 398/1 |
| 6,744,964 B1 | * | 6/2004 | Vittal | 385/140 |
| 7,016,726 B1 | * | 3/2006 | Picardo et al. | 607/5 |
| 7,375,876 B2 | | 5/2008 | Yoshida | |
| 7,483,205 B1 | * | 1/2009 | Lundquist et al. | 359/341.3 |
| 2008/0031620 A1 | * | 2/2008 | Hudgins et al. | 398/9 |
| 2008/0094692 A1 | | 4/2008 | Yoshida | |
| 2008/0253764 A1 | * | 10/2008 | Collings et al. | 398/37 |
| 2009/0041467 A1 | * | 2/2009 | Carleton et al. | 398/135 |

FOREIGN PATENT DOCUMENTS

| | | |
|---|---|---|
| JP | 11-249088 | 9/1999 |
| JP | 2001-230726 | 8/2001 |
| JP | 2002-350791 | 12/2002 |
| JP | 2005-294774 | 10/2005 |
| JP | 2006-203179 | 8/2006 |

OTHER PUBLICATIONS

Japanese Office Action issued Dec. 20, 2011 in corresponding Japanese Patent Application No. 2007-332864.

* cited by examiner

*Primary Examiner* — Ken Vanderpuye
*Assistant Examiner* — Darren E Wolf
(74) *Attorney, Agent, or Firm* — Staas & Halsey LLP

(57) ABSTRACT

An optical transmission apparatus including a variable optical attenuator is provided. The optical transmission apparatus includes a module detection portion for detecting a type of module that receives light attenuated by the variable optical attenuator; and a variable optical attenuator control portion for controlling so as to change control parameters of the variable optical attenuator in accordance with the type of module detected by the module detection portion.

2 Claims, 8 Drawing Sheets

FIG. 4

| MODULE ID | FEED-FORWARD CONTROL |
|---|---|
| A COMPANY | 0.8 |
| B COMPANY | 1.2 |
| ⋮ | ⋮ |

OPTICAL TRANSMISSION APPARATUS AND METHOD FOR CONTROLLING VARIABLE OPTICAL ATTENUATOR

CROSS-REFERENCE TO RELATED APPLICATIONS

This application is related to and claims priority to Japanese Patent Application No. 2007-332864, filed on Dec. 25, 2007, and incorporated by reference herein.

BACKGROUND

1. Field

The embodiments discussed herein are directed to an optical transmission apparatus for controlling a variable optical attenuator, and a method for controlling the variable optical attenuator.

2. Description of the Related Art

Conventionally, wavelength division multiplexing ("WDM") transmission has been viewed in terms of increasing transmission capacity. In the WDM transmission, an optical transmission apparatus controls a variable optical attenuator for variably attenuating received light and enlarges the dynamic range of intensity of receiving light.

In such an optical transmission apparatus, a variable optical attenuator is installed in a preceding stage of a light receiving module, and a change in the light receiving intensity is detected by a power monitor of the light receiving module, wherein feedback control is executed in accordance with a change in the corresponding light receiving intensity.

The light receiving module may be based on an MSA (multi-source agreement) by which product specifications may be standardized, and common specifications adopted for the purpose of compatibility among products from a plurality of vendors. Therefore, when a same type of apparatus is replaced, the optical transmission apparatuses may be produced by using light receiving modules from multiple vendors.

In using a light receiving module from multiple vendors, since characteristics of power monitors used to control a variable optical attenuator may differ from each other depending on the manufacturer and type, a problem exists in that design is difficult enabling the variable optical attenuator to execute appropriate operations by the same control circuit with respect to the light-receiving modules supplied from multiple vendors.

SUMMARY

It is an aspect of the embodiments discussed herein to provide an optical transmission apparatus including a variable optical attenuator; a module detection portion for detecting a type of module that receives light attenuated by the variable optical attenuator; a variable optical attenuator control portion for controlling so as to change control parameters of the variable optical attenuator in accordance with the type of module detected by the module detection portion.

These together with other aspects and advantages which will be subsequently apparent, reside in the details of construction and operation as more fully hereinafter described and claimed, reference being had to the accompanying drawings forming a part hereof wherein like numerals refer to like parts throughout.

BRIEF DESCRIPTION OF DRAWINGS

FIG. 4 illustrates an exemplary control parameter table;

DETAILED DESCRIPTION OF THE EMBODIMENTS

A detailed description is given of exemplary embodiments including an optical transmission apparatus, a method for controlling a variable optical attenuator and an optical transmission apparatus including a variable optical attenuator-controlling program according to the invention.

Figure 1:
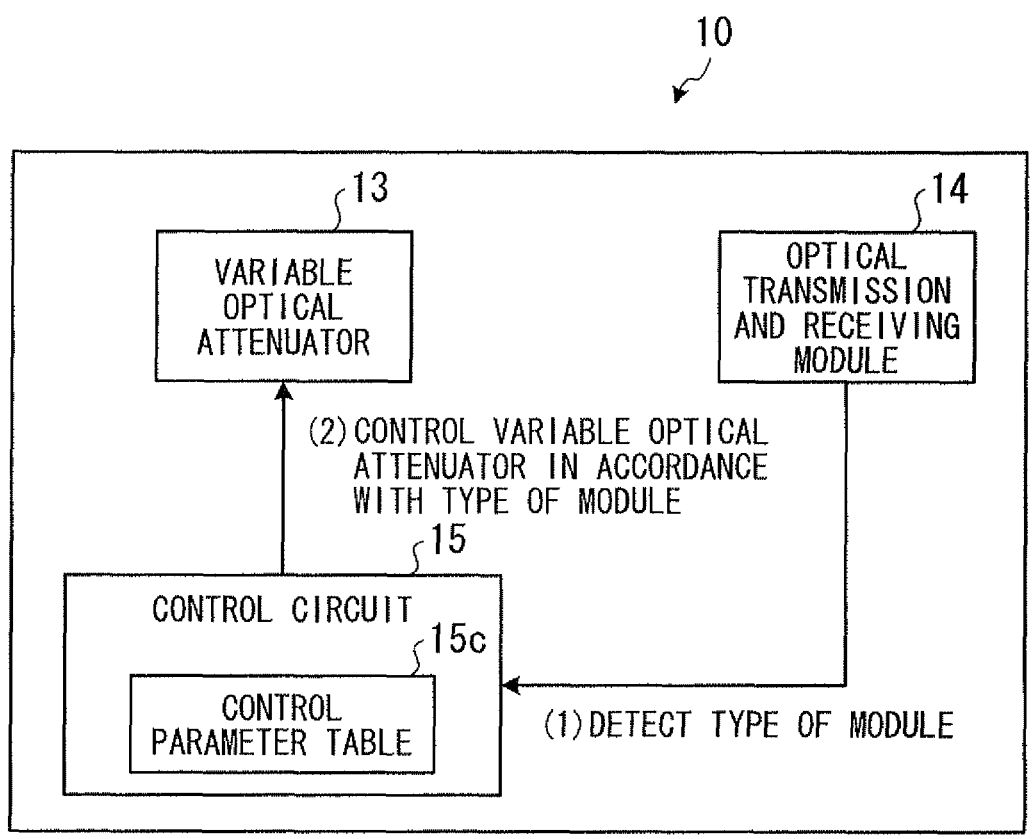
FIG. 1 illustrates an optical transmission apparatus according to an exemplary embodiment.

FIG. 1 illustrates an optical transmission apparatus according to an exemplary embodiment.

The optical transmission apparatus 10 according to an exemplary embodiment controls a variable optical attenuator that variably attenuates received signal light, and controls the variable optical attenuator.

The optical transmission apparatus 10 includes a control parameter table 15c that may store the types of optical transmission and receiving modules 14 and control parameters of a variable optical attenuator 13 in association with each other.

The optical transmission apparatus 10 detects the type of optical transmission. A receiving module 14 receives signal light attenuated by the variable optical attenuator 13 (See, for example, (1) of FIG. 1). A control circuit 15 of the optical transmission apparatus 10 detects a module ID, which identifies a production maker of the optical transmission and receiving module 14, via a control bus.

The optical transmission apparatus 10 changes control parameters of the variable optical attenuator 13 in accordance with a detected module ID (See, for example, (2) of FIG. 1). The control circuit 15 of the optical transmission apparatus 10 retrieves a control parameter corresponding to the detected module ID from the control parameter table 15c and executes control to change a corresponding attained control parameter to the control parameter of the variable optical attenuator 13.

For example, the control circuit 15 of the optical transmission apparatus 10 may set the ratio of feed-forward control to a lower value and sets the ratio of feedback control to a larger value in a case where the response of the monitor circuit of the optical transmission and receiving module 14 is sufficiently fast. In a case where delay of the monitor circuit of the optical transmission and receiving module 14 is large, however, the control circuit 15 of the optical transmission apparatus 10 may set the ratio of feed-forward control to a larger value and may set the ratio of feedback control to a lower value. That is, since the delay time and control target level differ in accordance with the type of optical transmission and receiving module 14 used, the control circuit 15 appropriately sets parameters regarding the feedback control and feed-forward control for respective types thereof.

Thus, since the optical transmission apparatus 10 selects appropriate control parameters preset for components and controls the variable optical attenuator 13, a plurality of types of optical transmission and receiving modules 14 may be controlled by the same control circuit. Thus, even where the types of optical transmission and receiving modules 14 differ, it is possible to effectively control the variable optical attenuator 13.

Figure 2:
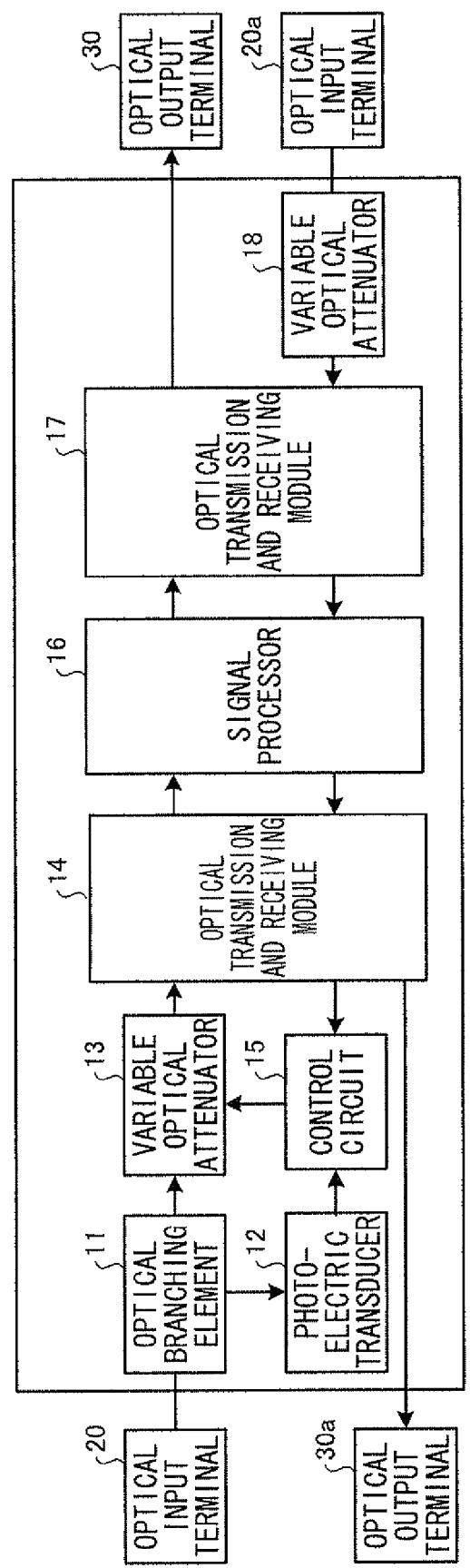
FIG. 2 illustrates a configuration of the optical transmission apparatus according to an exemplary embodiment.
Figure 3:
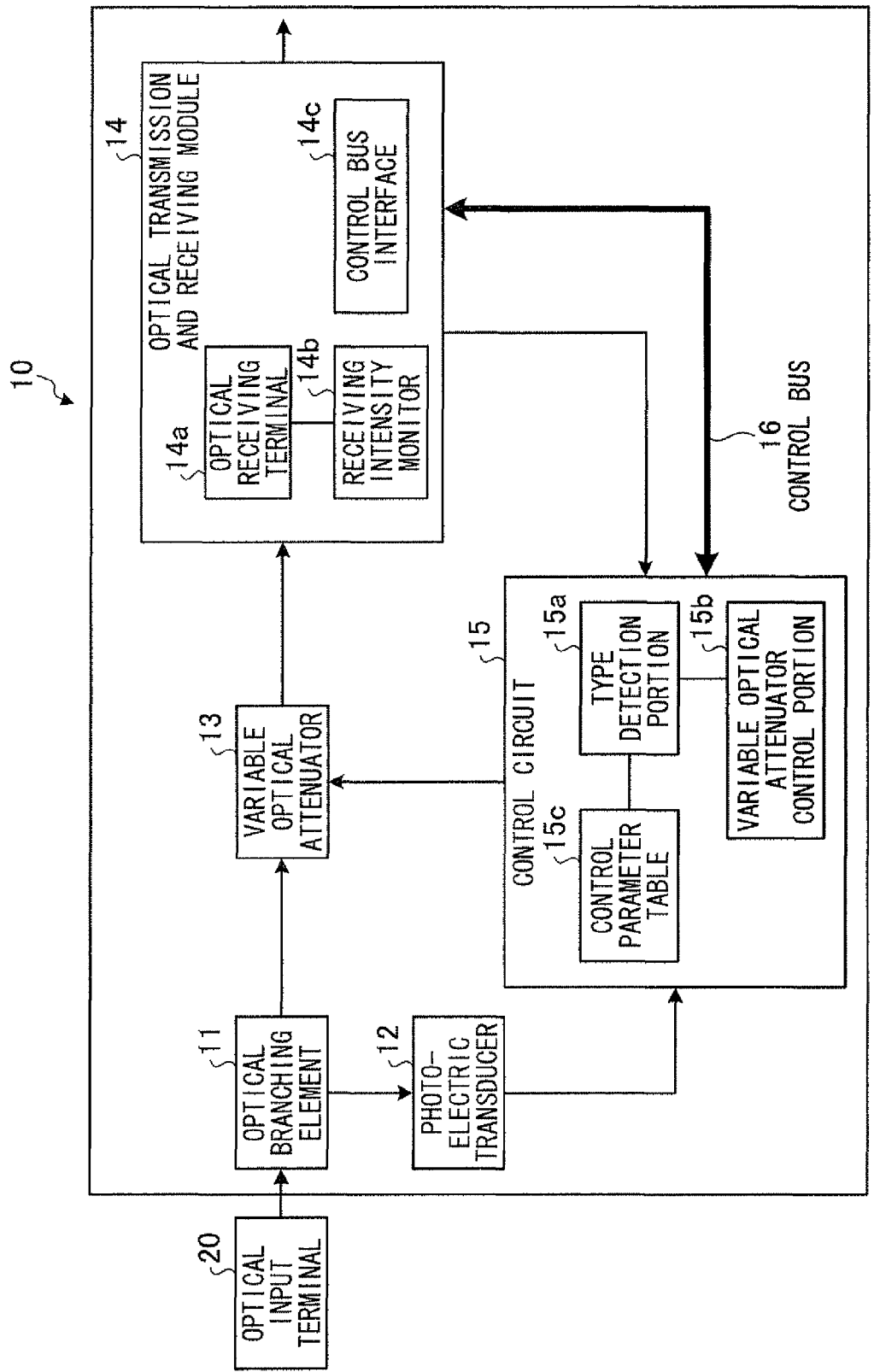
FIG. 3 illustrates a configuration of the optical transmission apparatus according to an exemplary embodiment.

FIG. 2 and FIG. 3 illustrate an optical transmission apparatus 10 according to an exemplary embodiment.

As illustrated in FIG. 2, the optical transmission apparatus 10 includes a photo-electric transducer 12, a variable optical attenuator 13, an optical transmission and receiving module 14, a control circuit 15, a signal processor 16, an optical transmission and receiving module 17, and a variable optical attenuator 18, and is connected to optical input terminals 20,20a and optical output terminals 30,30a via input/output ports, etc. An optical transmission apparatus 10 is described using FIG. 2 and a detailed description is given of an optical branching element 11, a photo-electric transducer (or converter) 12, a variable optical attenuator 13, an optical transmission and receiving module 14, and a control circuit 15.

As illustrated in FIG. 2, the optical branching element 11 branches optical signals from a transmission line, which are input by the optical input terminal 20, and inputs the optical signals into the photo-electric transducer 12 and the variable optical attenuator 13. The photo-electric transducer 12 transduces (or converts) the optical signals input by the optical branching element 11 to electric signals and inputs the same in the control circuit 15.

The variable optical attenuator 13 variably attenuates the intensity of optical signals so that the intensity can be accommodated in a receiving range where the light intensity of the optical signals input from the optical branching element 11 is high, and inputs the same into the optical transmission and receiving module 14. The optical transmission and receiving module 14 transduces the optical signals input from the variable optical attenuator 13 to electric signals, notifies the signal processor 16, and monitors the intensity of the input signals.

The signal processor 16 executes predetermined signal processing for electric signals notified by the optical transmission and receiving module 14 and transfers the same to the optical transmission and receiving module 17. The optical transmission and receiving module 17 transduces the electric signals transferred from the signal processor 16 to optical signals, inputs the same into the optical output terminal 30 and transmits the same to the opposite side transmission line.

FIG. 3 illustrates respective processes in the optical branching element 11, photo-electric transducer 12, variable optical attenuator 13, optical transmission and receiving module 14 and control circuit 15.

As illustrated in FIG. 3, in order to monitor the light intensity of optical signals input by the optical input terminal 20 at a preceding stage of the variable optical attenuator 13, the optical branching element 11 inputs light of a fixed ratio into the photo-electrical transducer 12 via the optical branching element 11 and inputs the remaining main signals into the variable optical attenuator 13.

The photo-electric transducer 12 monitors the intensity of optical signals input from the optical branching element 11 and notifies the control circuit of the light intensity as a monitor value. In accordance with the monitor value, the control circuit 15 determines the amount of attenuation of the feed-forward control and controls the variable optical attenuator 13.

The variable optical attenuator 13 attenuates the intensity so that it can be accommodated in the receiving range where the light intensity is high. In detail, the variable optical attenuator 13 attenuates the light intensity in accordance with the control parameters that are set by the control circuit 15. For example, the control circuit 15 establishes, as the control parameters, a "threshold value" for whether or not the feed-forward control is executed, an "amount of attenuation" by which the signal light is attenuated by the feed-forward control, and a "ratio" between the feed-forward control and the feedback control.

Figure 5:
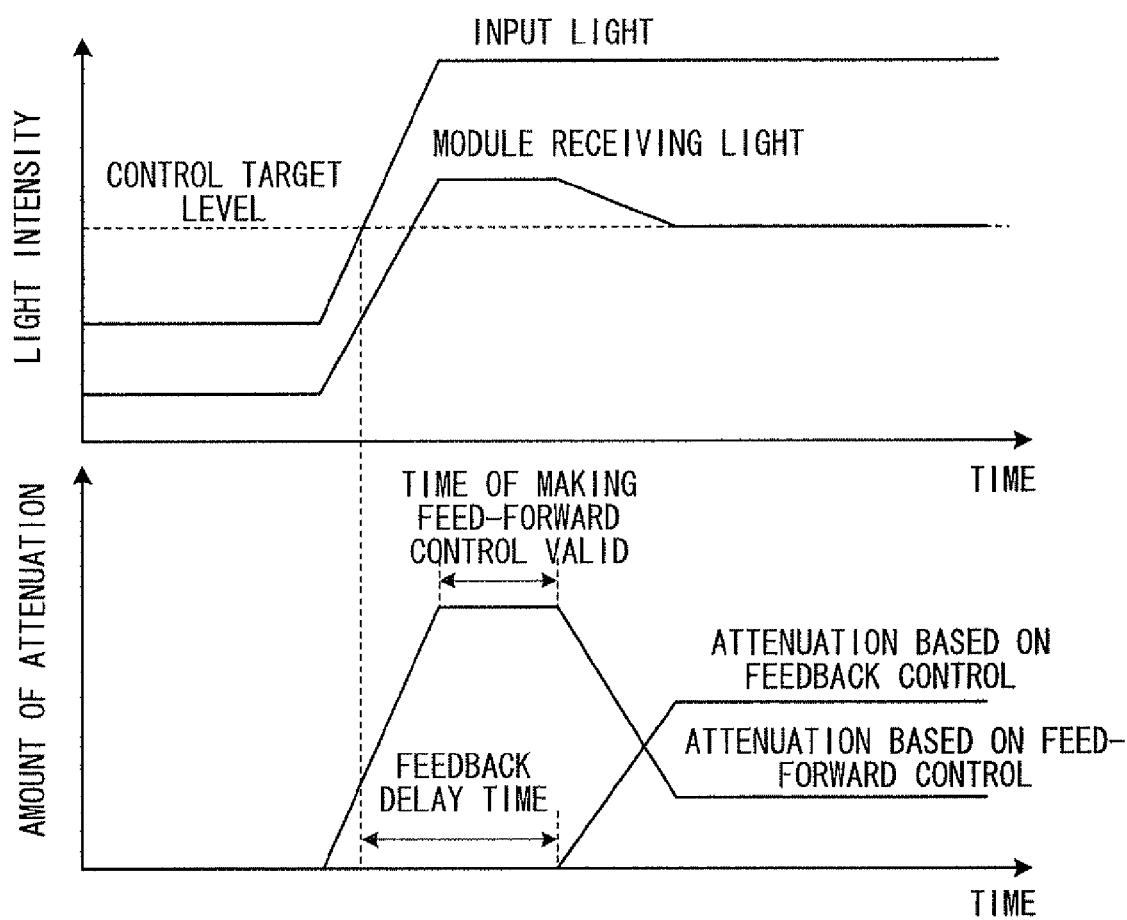
FIG. 5 illustrates control operations of a variable optical attenuator.

FIG. 5 illustrates control actions of the variable optical attenuator 13. The example of FIG. 5 shows a change in a case where input light into the apparatus rapidly becomes intensive, as an exemplary actions of the variable optical attenuator 13. As illustrated in FIG. 5, where the input light into the apparatus rapidly becomes intensive, the variable optical attenuator 13 attenuates the light intensity of the input light, so that the light intensity of module receiving light, which the optical transmission and receiving module 14 receives, is accommodated in the control target level.

The variable optical attenuator 13 executes attenuation control based on the feed-forward and attenuation control based on the feedback as attenuation control of the light intensity. As illustrated in FIG. 5, the attenuation control based on the feedback shows components based on a monitor function of the optical transmission and receiving module 14 described later. Although accurate control can be executed where the input light into the apparatus rapidly becomes intensive, response to a change in the input light is delayed (See, for example, "feedback delay time" in FIG. 5).

In attenuation control based on feed-forward expresses components based on an amount of monitor of the photo-electric transducer 12, wherein delay in the response to a change in the input light can be disregarded, it may be difficult to execute accurate attenuation control. In an exemplary embodiment, however, such control may be achieved, which can satisfy both response rate and accuracy by appropriately combining the feedback control with the feed-forward control.

That is, since the delay time and control target level differ in accordance with the type of optical transmission and receiving module 14, in an exemplary embodiment, such control is executed, in which control parameters of the feedback control and feed-forward control are changed over by the control circuit 15 according to the type of optical transmission and receiving model 14.

For example, where the response of the monitor circuit of the optical transmission and receiving module 14 is sufficiently fast, the control circuit 15 may set the ratio of the feed-forward control to a smaller value to increase the ratio of the feedback control. That is, since the delay time of feedback is short if the response of the monitor circuit of the optical transmission and receiving module 14 is sufficiently fast, the time of making the feed-forward control valid is shortened.

On the other hand, since the delay time of feedback may be long where the delay of the monitor circuit of the optical transmission and receiving module 14 is large, the time of making the feed-forward control valid may be lengthened. The "time of making feed-forward control valid" may be defined as a time of feed-forward control executed during the period in which the feedback control is not executed due to feedback delay (See, for example, FIG. 5).

As illustrated in FIG. 3, the optical transmission and receiving module 14 transduces optical signals input from the variable optical attenuator 13 to electric signals and notifies the signal processor 16 of the same, and monitors the input signal intensity. The optical transmission and receiving module 14 includes an optical receiving terminal 14a, a receiving intensity monitor 14b and a control bus interface 14c. In addition, the optical transmission and receiving module 14 may store the module ID, which shows the production maker thereof, in a storage (not illustrated).

The optical receiving terminal 14a receives optical signals input from the variable optical attenuator 13. The receiving intensity monitor 14b monitors the light intensity of optical signals received by the optical receiving terminal 14a. The receiving intensity monitor 14b monitors the light intensity of optical signals input into the optical receiving terminal 14 and a change in the light intensity, and notifies the control circuit 15 of the light intensity as a monitor value. Based on a monitor value, the control circuit 15 determines the amount of attenuation of the feed-forward control and controls the variable optical attenuator 13.

The control bus interface 14c transmits and receives data between the optical transmission and receiving module 14 and the control circuit 15. The control bus interface 14c receives a request of notifying the type of the optical transmission and receiving module 14 from the control circuit 15, and transmits the type of the optical transmission and receiving module 14 to the control circuit 15.

The control circuit 15 includes an internal memory for storing programs, which prescribe various types of processing procedures, and required data, and executes various processes in accordance therewith. The control circuit 15 includes a type detection portion 15a, a variable optical attenuator control portion 15b and a control parameter table 15c.

The type detection portion 15a may serve as a module detector. The variable optical attenuator control portion 15b may serve as a variable optical attenuator controller.

The control parameter table 15c may store the types of optical transmission and receiving module 14 and control parameters of the variable optical attenuator 13 in association with each other. The control parameter table 15c may store, as illustrated in FIG. 4, the "module ID" showing a production maker of the optical transmission and receiving module 14 and the ratio of time of making the "feed-forward control" valid as the control parameters in association with each other.

That is, since the feedback delay time may differ according to the type of optical transmission and receiving module 14, the time of making the "feed-forward control" valid may be adjusted in accordance with the type of optical transmission and receiving module 14. A description is given using the example of FIG. 4. The control parameter table 15c, illustrated in FIG. 3, may store a control parameter, by which the time of making the feed-forward control valid is shortened, with the ratio of the time of making the "feed-forward control" valid set to a value such as "0.8", as illustrated in FIG. 4, where the response of the monitor circuit in the optical transmission and receiving module 14 of module ID, for example, "A company" as illustrated in FIG. 4, is sufficiently fast and the feedback delay time is short.

The control parameter table 15c may store a control parameter, by which the time of making the feed-forward control valid is lengthened, with the ratio of the time of making the "feed-forward control" valid set to, for example, as illustrated in FIG. 4, "1.2" where the response of the monitor circuit in the optical transmission and receiving module 14 of module ID "B company" is slow and the feedback delay time is long.

As illustrated in FIG. 3, the type detection portion 15a detects the type of optical transmission and receiving module 14 which receives signal light attenuated by the variable optical attenuator 13. The control circuit 15 of the optical transmission apparatus 10 detects the module ID showing a production maker of the optical transmission and receiving module 14 via the control bus 16.

The variable optical attenuator control portion 15b executes control to change control parameters of the variable optical attenuator 13 in accordance with a detected module ID. In detail, the control circuit 15 of the optical transmission apparatus 10 attains a control parameter corresponding to the detected module ID from the control parameter table 15c and uses the corresponding attained control parameter as the control parameter of the variable optical attenuator 13.

Where the variable optical attenuator control portion 15b attains a certain ratio, for example, ratio "0.8" of the time of making the feed-forward control valid as a control parameter from the control parameter table 15c, the variable optical attenuator control portion 15b executes controls to change the value obtained, for example, by multiplying the time of making the feed-forward control valid, which is retained as a default, by a value, for example, "0.8" as the time of making the feed-forward control valid.

Figure 6:
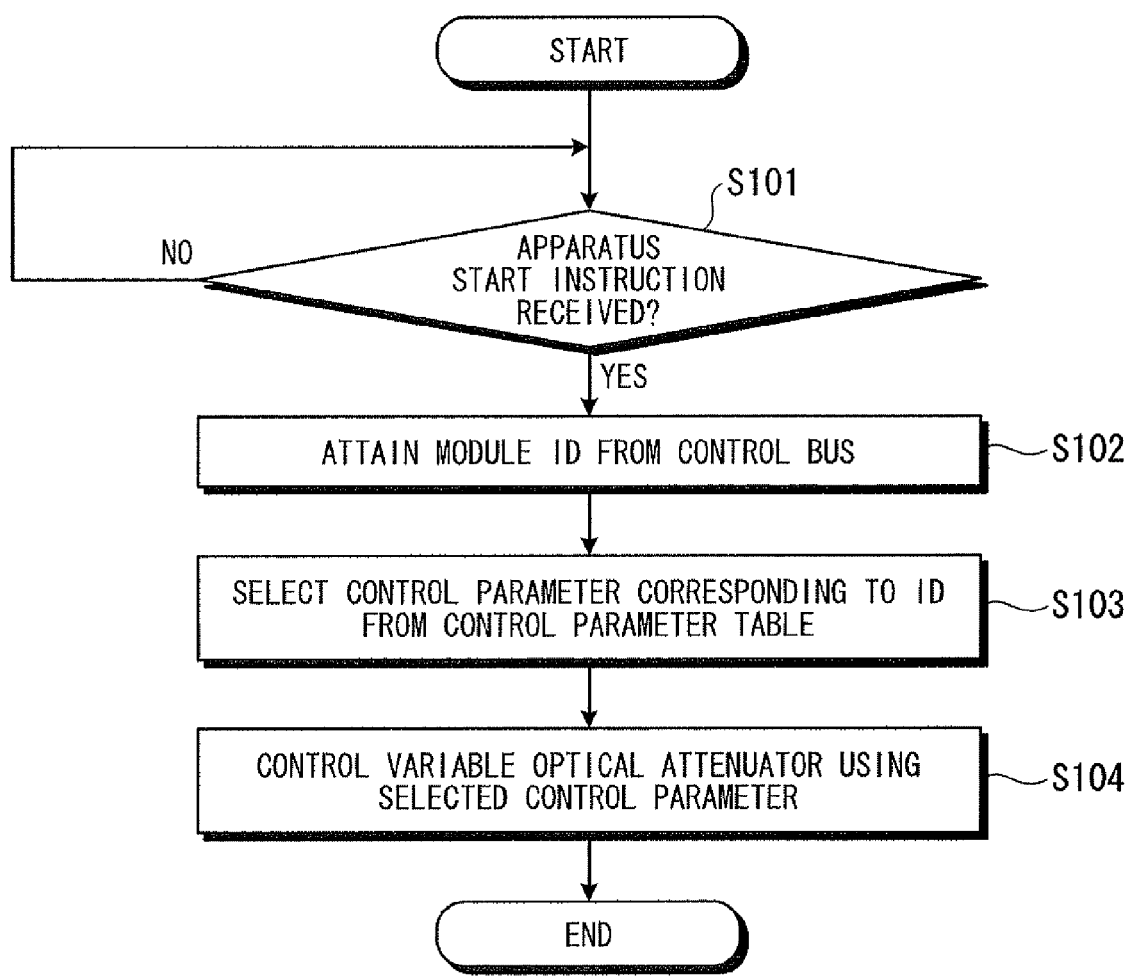
FIG. 6 illustrates processing actions of the optical transmission apparatus according to an exemplary embodiment.

FIG. 6 illustrates processing actions of the optical transmission apparatus 10 according to an exemplary embodiment.

As illustrated in FIG. 6, the control circuit 15 of the optical transmission apparatus 10 detects a module ID of the optical transmission and receiving module 14 via a control bus 16 (Operation S102) when it receives an apparatus start instruction (Operation S101 affirm).

The control circuit 15 selects a control parameter corresponding to the detected module ID from the control parameter table 15c (Operation S103) and controls the variable optical attenuator 13 using the corresponding selected control parameter as the control parameter for the variable optical attenuator 13 (Operation S104).

As described above, since the optical transmission apparatus 10 controls the variable optical attenuator by selecting an optimal control parameter preset for components, the same control circuit can control a plurality of types of optical transmission and receiving modules, and even where the types of optical receiving modules used are different, it is possible to effectively control the variable optical attenuator.

The present invention may be executed in various embodiments other than the exemplary embodiment described above. Therefore, another exemplary embodiment will be described below.

Although, in the first exemplary embodiment, a description was given of a case where control is executed to change the time of making the feed-forward control valid as a control parameter, the present invention is not limited thereto, wherein control may be executed so as to change, as the control parameter, a "threshold value" for whether the feed-forward control is executed or an "amount of attenuation" by which signal light is attenuated by the feed-forward control.

For example, the control circuit of the optical transmission apparatus includes a control parameter table for storing module IDs of optical transmission and receiving modules, a threshold value for whether the feed-forward control is executed or an amount of attenuation by which signal light is attenuated by the feed-forward control, in association with each other, and selects a control parameter corresponding to the module ID of a detected optical transmission and receiving module from the control parameter table 15c, and executes control to change the corresponding selected control parameter to the control parameter of the variable optical attenuator 13.

That is, the control circuit may appropriately set the "threshold value" for whether the feed-forward control is executed or the "amount of attenuation" by which signal light is attenuated by the feed-forward control, in accordance with the type of optical transmission and receiving module since the receiving range and control target level differ in accordance with the type of optical transmission and receiving module used.

Further, although, in the first exemplary embodiment described above, a description was given of a case where a production maker of an optical transmission and receiving model is detected as a module ID, the present invention is not limited thereto, wherein the product name and type number of an optical transmission and receiving module may be detected as the module ID.

Figure 7:
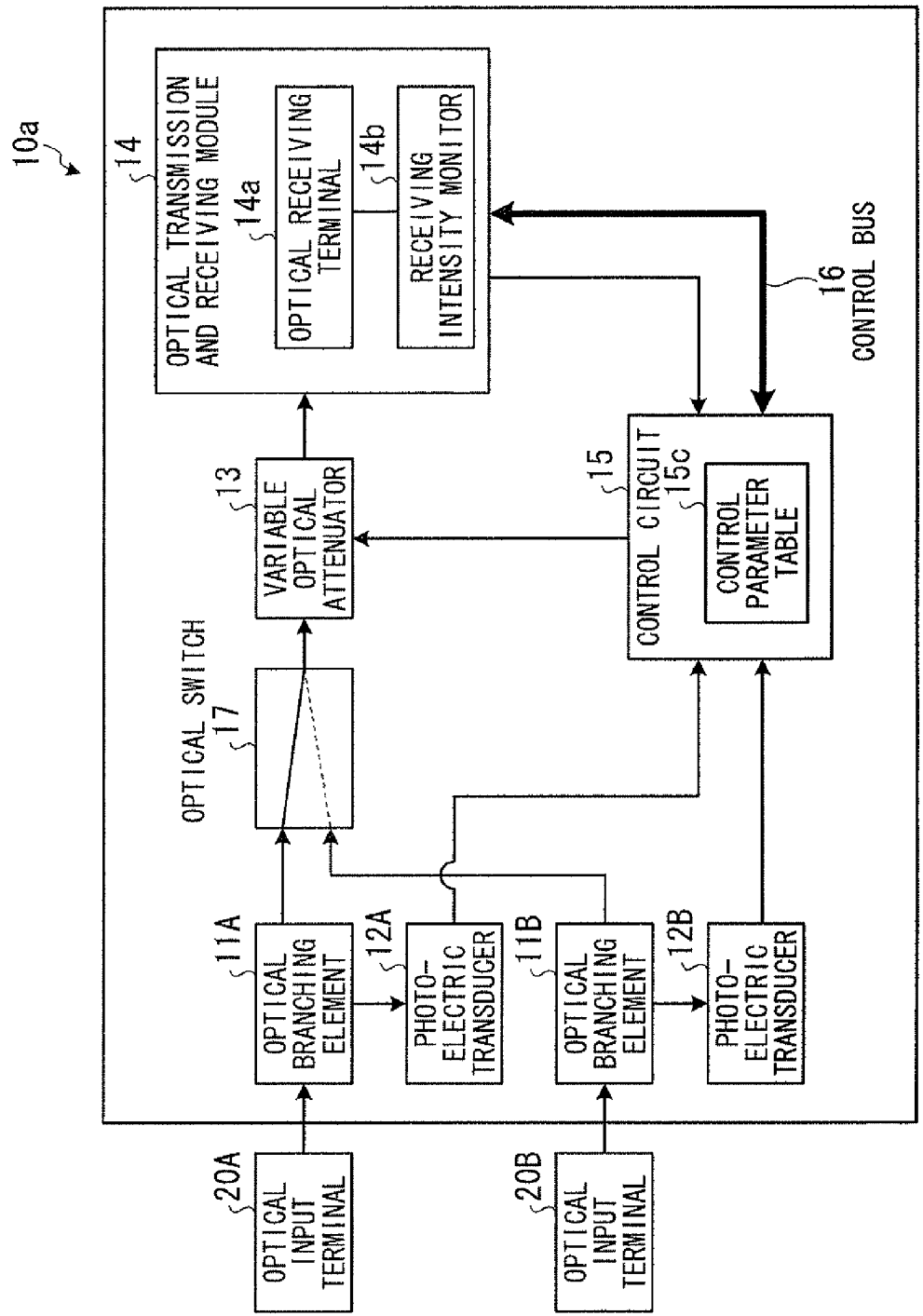
FIG. 7 illustrates a configuration of the optical transmission apparatus according to another exemplary embodiment.

In addition, the present invention may be applicable to a transmission apparatus having a redundancy configuration in the transmission line. As illustrated in FIG. 7, light input into the optical input terminals 20A, 20B is monitored by photoelectric transducers 12A, 12B, respectively, in the transmission line 10a having a redundancy configuration according to the second exemplary embodiment, any one of input light of the optical input terminals 20A, 20B is selected by an optical switch 17, and is received by the optical transmission and receiving module 14 after the selected optical signal is attenuated by the variable optical attenuator 13.

Even in a redundancy configuration, where it is difficult to design a variable optical attenuator to effectively operate by the same control circuit if the characteristics of the variable optical attenuator 13 differ in accordance with the manufacturers and types thereof similar effects can be brought about if the present invention is applied as in the first exemplary embodiment.

Components of the exemplary embodiments illustrated are representative and that is, modes of dispersion and integration of the exemplary apparatuses are not limited to those illustrated, wherein the entirety or a part of these apparatuses may be separated or integrated by an optional unit in accordance with various types of loads and use situations. For example, the type detection portion 15a and the variable optical attenuator control portion 15b may be integrated. Further, the entirety or any part of the respective processing executed in the respective apparatuses executed by a CPU or a program analyzed and executed by the corresponding CPU, or may be achieved by hardware, for example, based on a wired logic.

Further, all or a part of the processes, which are described as those automatically executed, among the respective processes may be manually executed, or all or a part of the processes, which are described as those manually executed, among the respective processes described may be automatically executed. In addition, the processing procedure, control procedure, detailed names and information including various types of data and parameters, which are illustrated in the above text and in the drawings may be altered except as specified herein. For example, control parameters that may be stored in the control parameter table may be changed.

Figure 8:
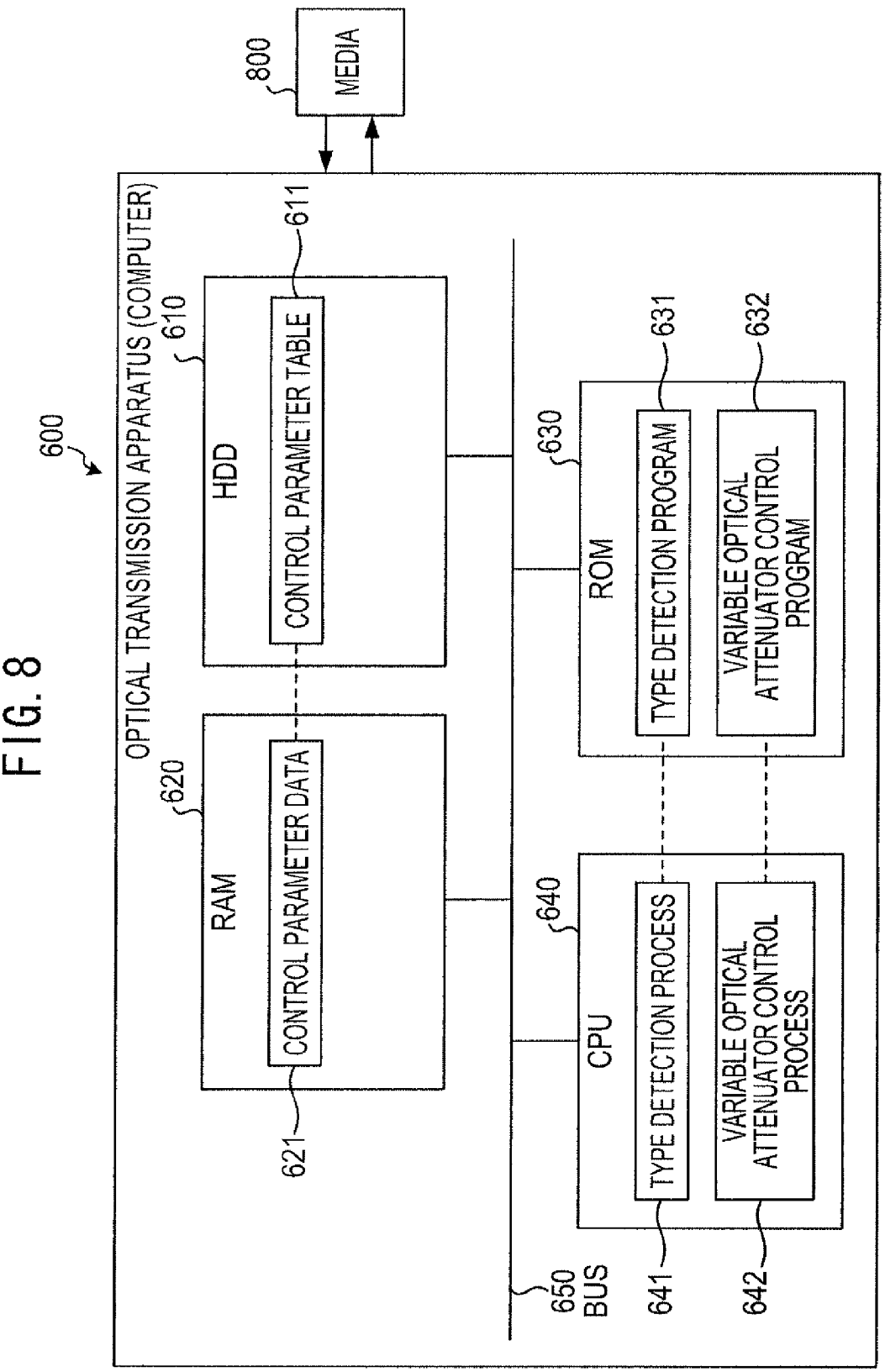
FIG. 8 illustrates a computer that executes a method for controlling a variable optical attenuator.

Various types of processes described in the embodiments described above may be achieved by executing programs prepared in advance by a computer. Therefore, hereinafter, using FIG. 8, a description is given of an exemplary a computer that executes programs having similar functions as in the embodiments described above. FIG. 8 is a view showing a computer that executes a method for controlling a variable optical attenuator.

As illustrated in FIG. 8, a computer 600 operating as an optical transmission apparatus includes a HDD 610, a RAM 620, a ROM 630 and a CPU 640 connected by a bus 650.

Variable optical attenuator controlling programs may be executed. As illustrated in FIG. 8, the type detection program 631 and variable optional attenuator controlling program 632 may be stored in the ROM 630 in advance. The programs 631 and 632 may be appropriately integrated or separated as in the respective components of the optical transmission apparatus illustrated in FIG. 3. Data and/or a program may be input by a computer-readable recording media 800, as illustrated in FIG. 8.

The CPU 640 may execute programs 631 and 632 by reading the same from the ROM 630, as illustrated in FIG. 8, so the respective programs 631 and 632 performing the type detection process 641 and the variable optical attenuator control process 642. The respective processes 641 and 642 correspond to the type detection portion 15a and the variable optical attenuator control portion 15b, which are illustrated in FIG. 3, respectively.

Also, the control parameter table 611 is provided in the HDD 610 as illustrated in FIG. 8. Further, the control parameter table 611 corresponds to the control parameter table 15c illustrated in FIG. 3. The CPU 640 registers data for the control parameter table 611, reads the control parameter data 621 from the control parameter table 611, may store the same in the RAM 620, and executes processes based on the control parameter data 621 stored in the RAM 620.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An optical transmission apparatus, comprising:
an optical receiver;
the optical receiver comprising:
an optical splitter;
a variable optical attenuator to attenuate light from the optical splitter;

a photoelectric transducer configured to output a control signal for the variable optical attenuator by feed-forward control, based on monitor light received from the optical splitter;

a module detector to detect a module-ID indicating a production maker of an optical receiver module that receives the light attenuated by the variable optical attenuator; and a variable optical attenuator controller to control so as to change control parameters of the variable optical attenuator in accordance with the module-ID detected by the module detector, wherein the variable optical attenuator controller controls the variable optical attenuator using, as the control parameter, at least one of a threshold value for whether the feed-forward control is executed based on the control signal and a ratio between feedback control and the feed-forward control.

2. A method to control a variable optical attenuator, comprising:

splitting an optical input signal;

attenuating light from the optical splitter with the variable optical attenuator;

outputting, based on monitor light received from the optical splitter, an electrical control signal for the variable optical attenuator by feed-forward control;

detecting, by a detector of an optical receiver, a module-ID indicating a production maker of an optical receiver module that receives light attenuated by the variable optical attenuator supplying the light only for an optical receiver module; and controlling the variable optical attenuator by changing control parameters of the variable optical attenuator in accordance with the module-ID detected by the module detector, wherein the control parameter includes at least one of a threshold value for whether the feed-forward control is executed, and a ratio between feedback control and the feed-forward control.

* * * * *